(12) United States Patent
Yamauchi et al.

(10) Patent No.: US 7,544,434 B2
(45) Date of Patent: Jun. 9, 2009

(54) DIRECT LIQUID FUEL CELL POWER GENERATING DEVICE AND METHOD OF CONTROLLING THE SAME

(75) Inventors: Takashi Yamauchi, Kanagawa-ken (JP); Masahiro Takashita, Kanagawa-ken (JP); Yoshihiko Nakano, Kanagawa-ken (JP); Yasuhiro Goto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 10/401,557

(22) Filed: Mar. 31, 2003

(65) Prior Publication Data

US 2004/0013928 A1    Jan. 22, 2004

(30) Foreign Application Priority Data

Mar. 29, 2002  (JP)  ............... 2002-097540

(51) Int. Cl.
*H01M 8/04* (2006.01)
(52) U.S. Cl. .............. 429/34; 429/12; 429/17; 429/30
(58) Field of Classification Search .......... 429/34
See application file for complete search history.

(56) References Cited

U.S. PATENT DOCUMENTS

| | | | |
|---|---|---|---|
| 2003/0031907 A1* | 2/2003 | Gottesfeld | 429/30 |
| 2003/0031908 A1* | 2/2003 | Bostaph et al. | 429/30 |
| 2003/0095872 A1* | 5/2003 | McNamee et al. | 429/30 |
| 2003/0129464 A1* | 7/2003 | Becerra et al. | 429/25 |
| 2003/0165720 A1* | 9/2003 | DeFilippis | 429/13 |
| 2004/0091763 A1* | 5/2004 | Drake | 429/34 |

FOREIGN PATENT DOCUMENTS

JP  07-124452  * 5/1995

* cited by examiner

*Primary Examiner*—Jonathan Crepeau
*Assistant Examiner*—Tony Chuo
(74) *Attorney, Agent, or Firm*—Oblon, Spivak, McClelland, Maier & Neustadt, P.C.

(57) ABSTRACT

A direct liquid fuel cell power generating device of the invention comprise an anode electrode, a cathode electrode, an electrolyte membrane held by the anode electrode and the cathode electrode, an anode Passage for passing a fuel, a cathode passage for passing an oxidizer, a fuel container connected to the feed port of the anode passage, and a cathode recovery container connected to the discharge port of the cathode passage for collecting the fuel supplied to an electromotive force section, an unreacted oxidizer, an a product of battery reaction, the device further comprising at least a mechanism for achieving gas-liquid contact by making contact between the substance discharged from the cathode discharge port and water existing in the cathode recovery container, and a mechanism for feeding the aqueous solution collected in the cathode recovery container into the fuel container.

11 Claims, 14 Drawing Sheets

DIRECT LIQUID FUEL CELL POWER GENERATING DEVICE AND METHOD OF CONTROLLING THE SAME

CROSSREFERENCE TO RELATED APPLICATION

This application is based upon and claims the benefit of priority from the prior Japanese Patent Application No. 2002-097540, filed on Mar. 29, 2002; the entire contents of which are incorporated herein by reference.

BACKGROUND OF THE INVENTION

1. Field of the Invention

The present invention relates to a direct liquid fuel cell power generating device, and more particularly to a direct liquid fuel cell power generating device using a methanol aqueous solution, and a method of controlling the same.

2. Description of the Related Art

A high performance secondary battery and fuel cell are highly expected as a power source for a portable electronic appliance supporting the information technology society, or as key element in an electric vehicle and a power storage system to solve the problems of air pollution and global warming In particular, as application to the electric vehicle, PEM using hydrogen and oxygen as fuel (PEFC, solid electrolyte fuel cell) has been thought to be hopeful. It is regarded to be suited to an electric vehicle from two viewpoints, that is, a high power is obtained by using clean energy or hydrogen and oxygen, and the power can be restored by refilling with fuel. It is, however, a fatal defect of fuel cell that the power is lowered in the case of a large load current change, and power generation at the time of quick acceleration is difficult. On the other hand, there is already an electric vehicle powered by a lithium ion secondary battery only, but it is considered difficult to apply the lithium ion secondary battery only in the electric vehicle owing to the safety problems or failure of power recovery even by refilling of an electrolyte solution. In this background, the hybrid battery (combination battery) having the features of both the lithium ion secondary battery and fuel cell is becoming important from the viewpoint of application to the electric vehicle. Further, to solve the problem of reduction of fuel volume used in PEM, it has been studied to use compressed hydrogen (250 atm), liquid hydrogen, hydrogen occluded alloy as fuel, or the like. In such a circumstance, the direct methanol fuel cell (DMEC) for generating power by taking out proton directly from methanol is attracting attention from this viewpoint in spite of the defect of smaller power as compared with PEM. By the feature of smaller fuel volume, the direct methanol fuel cell is considered to be applied to portable electronic appliances, and it is highly expected to be applied to multiple fields.

FIG. 15 is a schematic view of a conventional standard direct methanol fuel cell power generating device (Journal of Power Sources, 83, 204, 1999). An electromotive force section of a direct methanol fuel cell comprises an anode electrode including an anode substrate 3 and an anode catalyst layer 2, a cathode electrode including a cathode substrate 5 and a cathode catalyst layer 4, and an electrolyte membrane 1 disposed between the anode electrode and the cathode electrode. As shown in FIG. 16, an anode passage plate 150 has formed therein an anode passage 151 as a methanol channel including a methanol feed port 152 and a methanol discharge port 153. In FIG. 15, a methanol aqueous solution container 16 containing a methanol aqueous solution is connected to the methanol feed port 152 by way of a pump 19. A cathode passage plate 8 has formed therein a cathode passage 11 as a gas channel including an oxidizer feed port 14 and an oxidizer discharge port 15. Oxidizer feed means for feeding an oxidizer such as air is connected to the oxidizer feed port 14.

The electrolyte membrane is, for example, a Nafion membrane having a high proton conductivity. On the other hand, as a catalyst for use in an anode catalyst layer, for example, PtRu of low poisoning is used, or as a catalyst for used in a cathode catalyst layer, for example, Pt is used.

In such a direct methanol fuel cell power generating device, the power is generated in the principle of feeding a methanol aqueous solution to the anode catalyst layer, generating proton by catalytic reaction, and allowing the generated proton to pass through the electrolyte membrane to react with an oxygen supplied in the cathode catalyst layer on the catalyst.

To enhance the power of the direct methanol fuel cell, it is required to maintain a high electromotive force up to a high load current. First, to obtain a high load current, it is needed to increase the methanol volume per unit time to be supplied to the anode catalyst layer. However, the methanol aqueous solution permeates through the Nafion membrane, and a methanol aqueous solution which has not been spent for reaction in the anode catalyst layer reaches the cathode catalyst layer, and induces a similar reaction With the anode catalyst layer In the cathode catalyst layer, thereby producing a counterelectromotive force. This is the so-called crossover overvoltage, which leads to a problem of decrease of the electromotive force in the direct methanol fuel cell. This crossover overvoltage is more serious when the methanol concentration is higher, and when a methanol aqueous solution of 5 M or more is supplied to the anode catalyst layer, the power drops significantly Further, from the viewpoint of suppressing the deterioration of the electrolyte membrane such as a Nafion a membrane, it is preferred to keep the concentration of the methanol aqueous solution at 5 M or less. Hence, to operate the direct methanol fuel cell, it is preferred to keep the concentration of the methanol aqueous solution used as fuel at 5 M or less.

In another method of lowering the crossover overvoltage, all methanol supplied to the anode catalyst layer is spent in the anode catalyst layer, and is not passed into the cathode catalyst layer. That is, the catalyst activity in the anode catalyst layer is improved, or the catalyst carrying amount is increased, but such a method cannot be realized in the existing catalysts. It has been also attempted to develop a catalyst member not allowing the methanol aqueous solution which has not been spent in the anode catalyst layer to pass through the cathode catalyst layer, but actually such electrolyte membranes are mostly poor in the proton conductivity, and the power is lowered to the contrary. Hence, to lower the crossover overvoltage, it is effective to lower the methanol concentration in the methanol aqueous solution used as fuel. However, when using fuel of low concentration, a large fuel container is needed, which is contradictory to the feature of the direct methanol fuel cell.

Thus, although it is preferred to use a methanol aqueous solution at concentration of 5 M or less, if a dilute methanol aqueous solution of about 1 M is used as fuel, not only the volume of the methanol aqueous solution container is increased, but also methanol shortage is likely to occur in the reaction in the battery inside. Therefore, it is necessary to feed the methanol aqueous solution promptly from the methanol aqueous solution container.

In such operation, although the crossover overvoltage can be lowered and the battery power is increased, the pump power for supplying the methanol aqueous solution increases, and hence the power of the entire power generating device is lowered to the contrary.

As explained herein, from the viewpoint of fuel supply, it is preferred to feed a concentrated methanol aqueous solution at a small flow rate, but from the viewpoint of power, to the contrary, it is preferred to feed a dilute methanol aqueous solution at a large flow rate. That is, to decrease the fuel volume and obtain a high power, it is required to supply the methanol aqueous solution at the optimum concentration at an optimum flow rate.

As shown in FIG. 15 and FIG. 16, an ordinary direct methanol fuel cell is designed to supply a methanol aqueous solution to the anode passage plate 7 by means of a pump. The methanol aqueous solution supplied from the pump 19 flows in the portion of a groove 151 of the passage plate through an inlet 152 of the passage plate. The convex portion of the passage plate contacts with the anode substrate 3 such as an anode carbon paper, and the methanol aqueous solution flowing in the anode passage 10 permeates into the anode substrate 3, so that methanol is supplied into the anode catalyst layer 2.

However, all methanol aqueous solution flowing in the anode passage 10 does not permeate into the anode substrate 3, and is partly discharged from the methanol discharge port 153 of the passage plate 7. Accordingly, the utilization efficiency of the methanol aqueous solution in the container is generally low.

It has been attempted to modify the structure of the passage plate in order to enhance the efficiency, but the utilization efficiency has not been dramatically improved yet at the present. Alternatively, as shown in FIG. 17, it may be considered to design a mechanism of returning the methanol aqueous solution discharged from the discharge port 13 of the anode passage plate 7 back to the container. However, since methanol and water are spent equally in the anode catalyst layer, if the methanol aqueous solution discharged from the anode passage plate is returned to the container 16, the concentration of the methanol aqueous solution in the container is gradually lowered. As a result, methanol shortage occurs in the electromotive force section, and the electromotive force is decreased suddenly. Therefore, in the case of the liquid feed method in FIG. 17, a concentrated methanol aqueous solution of nearly 5 M must be used as the fuel. It is hence possible to suppress sudden methanol shortage in the battery and generate power for a long period of time, which will be effective liquid feeding means.

On the other hand, in reaction in the anode electrode, carbon dioxide is produced. As shown in FIG. 17, in a mechanism of returning an excess portion of the methanol aqueous solution into the methanol aqueous solution container by connecting the discharge port 13 of the anode passage and the methanol aqueous solution container 16, the carbon dioxide produced in the anode electrode is accumulated in the methanol aqueous solution container, and the internal pressure in the methanol aqueous solution container is elevated. Also, as shown in FIG. 15, even when an excess portion of the methanol aqueous solution is collected in another container without returning to the methanol aqueous solution container, if the container has a finite volume, the internal pressure in the container gradually climbs up. Anyway, the discharge pressure of the feed pump must be gradually raised, which results in drop of the entire power of the direct methanol fuel cell power generating device. Further, when carbon dioxide is collected at the anode electrode side, the effective catalyst surface area of the anode catalyst 2 is decreased, which may also result in an power drop. To avoid such inconvenience, the carbon dioxide produced at the anode electrode must be discharged to outside. However, since the methanol used as the fuel has a low boiling point, about 62° C., and it is easily gasified and mixed with carbon dioxide. Besides, since methanol is harmful for human health, 260 ppm or more must not be released to the atmosphere, Therefore, methanol gas and carbon dioxide must be separated and discharged separately. By the present technology, it is not easy to separate methanol gas and carbon dioxide. On the other hand, to decrease the evaporating amount of methanol gas, it has been considered to operate the fuel cell power generating device at low temperature. However, as compared with the operating temperature of 70 to 80° C. for obtaining the maximum power of the direct methanol cell, the power drops to not more than one-third at 30 degrees. It is hence impossible to generate power from the direct methanol fuel cell at low temperature.

Moreover, the methanol diffused in the anode catalyst layer 2 should be ideally spent entirely in reaction, but in the present power generation, byproducts are produced. Byproducts include formaldehyde and formic acid, and they are harmful for the environment and human health, and atmospheric emission is controlled. In particular, formaldehyde is toxic, and its atmospheric emission is strictly restricted to 0.5 μm or less. If these substances are mixed in the carbon dioxide, they may be discharged from the anode electrode side, and also same as methanol, they are high in solubility in water, and may be mixed in water produced in the cathode electrode, and the possibility of discharge from the cathode electrode side seems higher. Therefore, since the water produced in the cathode electrode contains methanol, formaldehyde, and formic acid, the water produced in the cathode electrode cannot be directly discharged outside. Moreover, since formaldehyde exists as gas at room temperature, it maybe discharged as gas from the cathode electrode. Therefore, when an excess oxidizer discharged from the cathode electrode is collected, formaldehyde may be contained, so that the gas collected from the cathode electrode by way of the oxidizer outlet 14 cannot be directly discharged outside.

In a method of separating carbon dioxide and methanol gas, for example, a mixed gas of carbon dioxide and methanol gas, is blown into an absorption pipe tilled with, as an adsorbent, an inorganic matter such as calcium chloride or magnesium chloride, activated carbon, or an organic matter for absorbing alcohol such as polyacrylic amide gel. This absorption pipe operates on the principle that these adsorbents adsorb methanol which is high in polarity, but does not adsorb carbon dioxide which is not polar. This adsorption pipe tray be also used for separating the gas discharged from the anode electrode of the direct methanol fuel cell power generating device, but the adsorbent must be replaced periodically. Further, since the operating temperature of 70 to 80° C. of the direct methanol fuel cell power generating device exceeds the boiling point of methanol, a massive methanol gas is discharged from the anode electrode. As a result, when such methanol gas is absorbed inside the absorption pipe, the fuel utilization efficiency is extremely lowered. Further, if an organic matter such as nitrophenyl hydrazine is used as the adsorbent in the absorption pipe, although the oxidizer generated from the cathode electrode and formaldehyde can be separated, water is generated from the cathode electrode, and therefore the absorption pipe may be filled with water. It is hence necessary to separate the liquid components first from the substances discharged from the cathode electrode, and then separate by using the absorption pipe, and the piping in the direct methanol fuel cell power generating device is complicated.

SUMMARY OF THE INVENTION

According to a first aspect of the present invention, there is provided a direct liquid fuel cell power generating device comprising;

an electromotive force section unit composed of an anode electrode formed of an anode catalyst layer and an anode substrate, a cathode electrode formed of a cathode catalyst layer and a cathode substrate, and an electrolyte membrane carried in contacting with the anode catalyst layer and the cathode catalyst layer;

an anode passage plate forming a fuel passage disposed in contact with the anode substrate;

a cathode passage plate forming an oxidizer passage disposed in contact with the cathode substrate;

an anode feed port for feeding fuel to one end of the fuel passage, and an anode discharge port disposed at the other end of the fuel passage;

a cathode feed port for feeding an oxidizer to one end of the oxidizer passage, and a cathode discharge port disposed at the other end of the oxidizer passage;

a fuel container connected to the anode feed port; and a cathode recovery container connected to the cathode discharge port for collecting the fuel supplied to the electromotive force section unit, an unreacted matter of the oxidizer, and a product of battery reaction in the electromotive force section, the device further comprising at least:

a mechanism connecting the cathode discharge port and the cathode recovery container by piping for achieving gas-liquid contact by making contact between the substance discharged from the cathode discharge port and water existing in the cathode recovery container; and a mechanism for feeding the aqueous solution collected in the cathode recovery container into the fuel container.

In the first aspect of the invention, it is also preferred to comprise another fuel container containing fuel of high concentration connected to the fuel container through liquid feed means. It is further preferred to dispose fuel flow rate control means between the fuel container and the anode feed port By these means, long-time operation can be realized in the direct liquid fuel cell power generating device of the invention.

Also in the first aspect of the invention, preferably, at least one of the fuel container and the cathode recovery container is composed of a container main body, and a partition board disposed in the container main body for separating into gas and liquid, and part or whole of the partition board is composed of a gas-liquid separation membrane. This means is necessary when applying the direct liquid fuel cell power generating device in a power source of a mobile appliance.

According to a second aspect of the present invention, there is provided a method of controlling a direct liquid fuel cell power generating device, comprising:

an electromotive force section unit composed of an anode electrode formed of an anode catalyst layer and an anode substrate, a cathode electrode formed of a cathode catalyst layer and a cathode substrate, and an electrolyte membrane carried in contact with the anode catalyst layer and the cathode catalyst layer;

an anode passage plate forming a fuel passage disposed in contact with the anode substrate;

a cathode passage plate forming an oxidizer passage disposed in contact with the cathode substrate;

an anode feed port for feeding fuel to one end of the fuel passage, and an anode discharge port disposed at the other end of the fuel passage;

a cathode feed port for feeding an oxidizer to one end of the oxidizer passage, and a cathode discharge port disposed at the other end of the oxidizer passage;

a fuel container connected to the anode feed port; and a recovery container connected to the cathode discharge port for collecting the fuel supplied to the electromotive force section, an unreacted matter of the oxidizer, and a product of battery reaction in the electromotive force section unit, wherein power electric energy of the fuel cell power generating device is measured, and the consumption of the fuel is estimated on the basis of a cumulative value of the electric energy, and the supply of the fuel from the fuel container into the anode feed port is increased when exceeding a predetermined consumption.

In this method, long-time operation can be realized in the direct liquid fuel cell power generating device.

In the invention, an aqueous solution of methanol is preferred as liquid fuel, but not limited to this, any volatile lower alcohol such as ethanol may be used. Not limited to a single substance of alcohol, an aqueous solution of mixture of plural alcohols may be also used, or it may contain other volatile organic substances that can be decomposed by a catalyst.

DESCRIPTION OF THE PREFERRED EMBODIMENTS

In the following explanation of preferred embodiments of the invention, a methanol aqueous solution is used as liquid fuel, but the invention is not limited to the methanol aqueous solution as the liquid fuel cell.

First Embodiment

A first direct methanol fuel cell power generating device of the invention is described while referring to FIG. 1 to FIG. 5.

Figure 1:
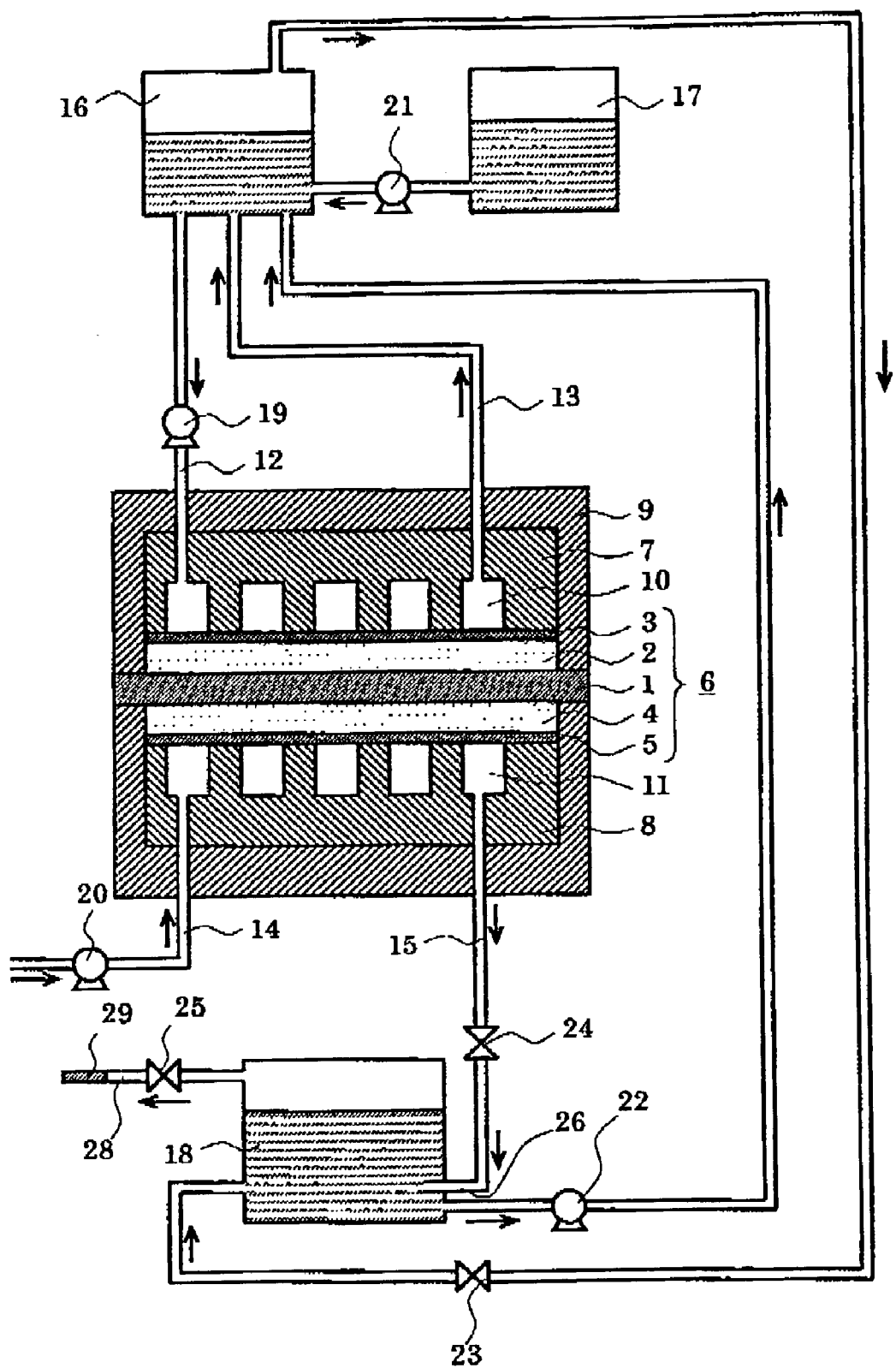
FIG. 1 is a schematic diagram showing an embodiment of a direct liquid fuel cell power generating device of the invention.
Figure 2:
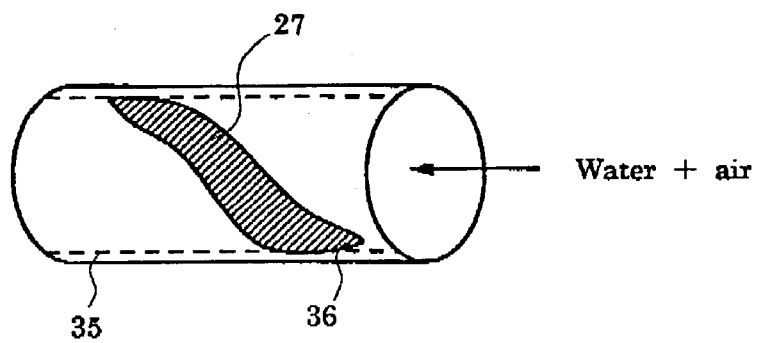
FIG. 2 is a schematic diagram showing an example of a check valve for use in the invention.
Figure 3:
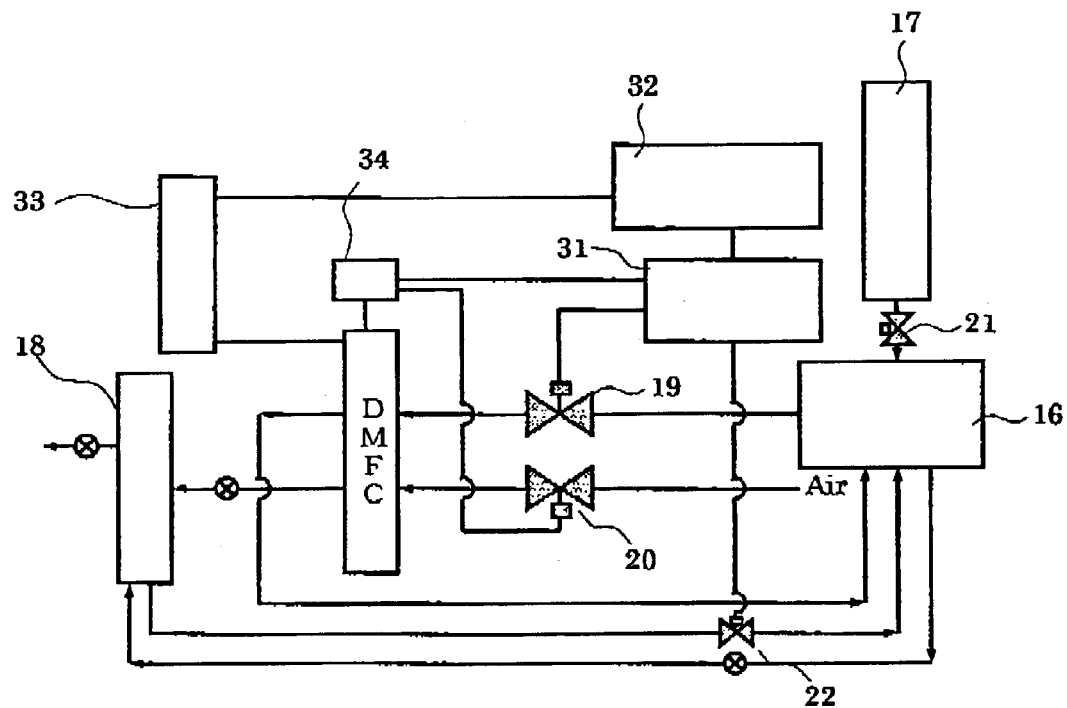
FIG. 3 is a conceptual diagram showing a control system of the direct liquid fuel cell power generating device of the invention.
Figure 4:
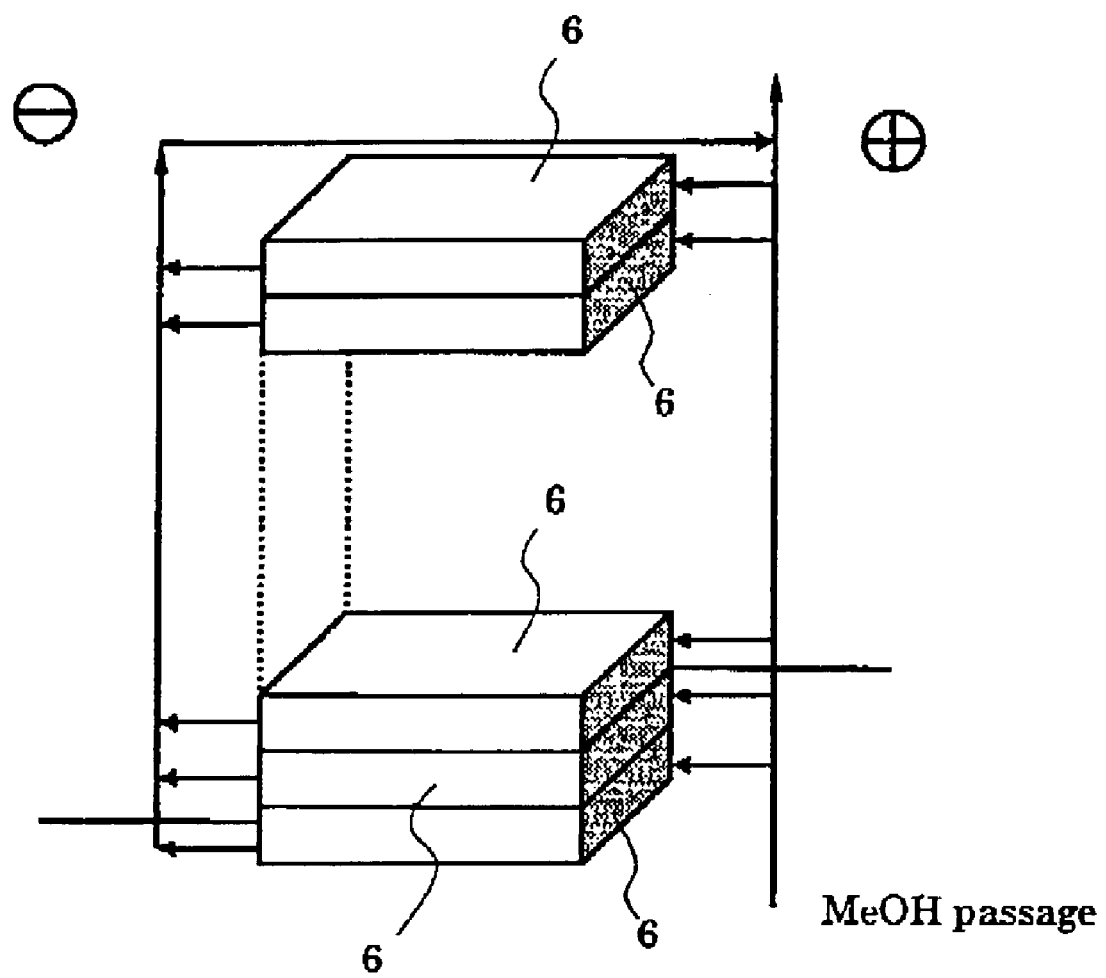
FIG. 4 is a schematic diagram showing an example of a methanol aqueous solution feed method in the case of series connection by laminating an electromotive force section of a direct liquid fuel cell power generating device according to a modified example of the embodiment.
Figure 5:
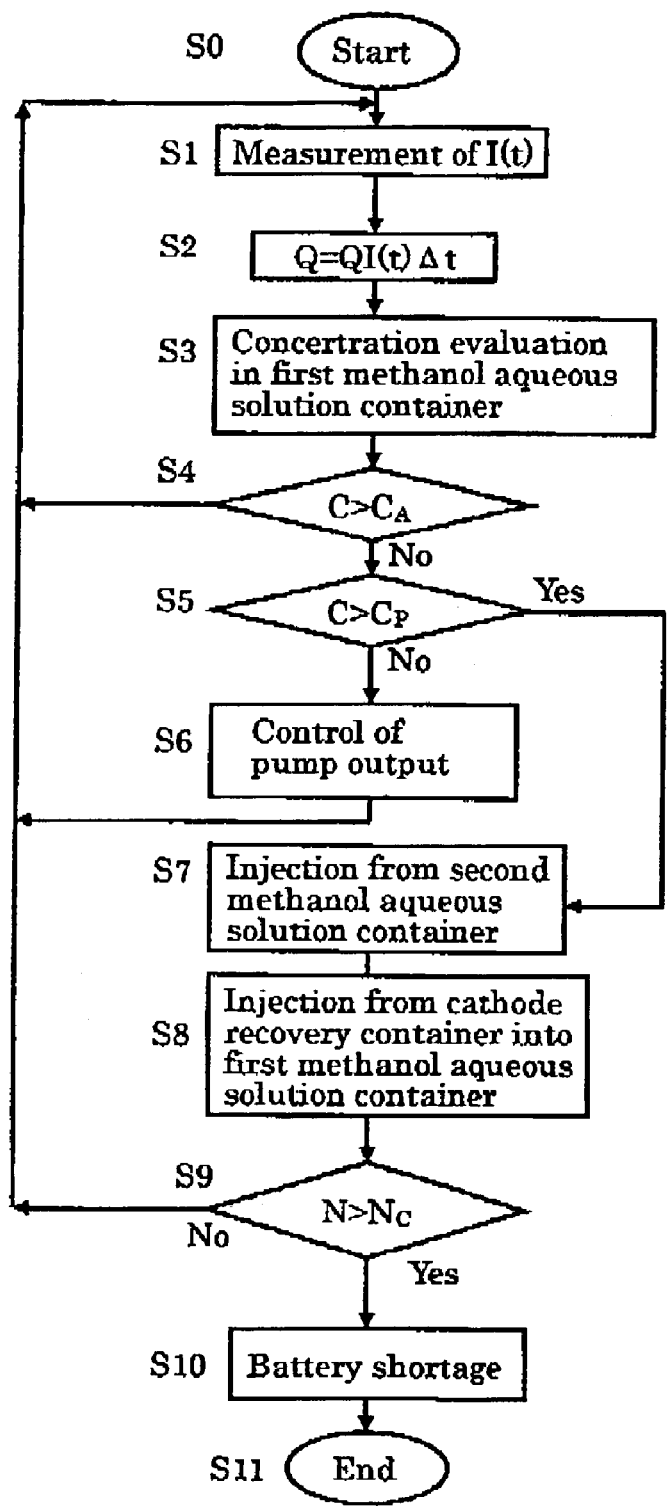
FIG. 5 is a flowchart of operation of the direct methanol fuel cell power generating device of the invention.

FIG. 1 is a schematic diagram showing a configuration of an embodiment of a first direct methanol fuel cell power generating device according to the invention, and FIG. 2 is a diagram snowing an example of a check valve shown in FIG. 1. FIG. 3 is a circuit diagram for controlling the first direct methanol fuel cell power generating device shown in FIG. 1. FIG. 4 is a schematic diagram showing a series laminated state of an electromotive force section of the direct liquid methanol cell power generating device. FIG. 5 is a flowchart showing an example of procedure for operating the first direct methanol fuel cell power generating device of the invention.

A fuel cell electromotive force section 6 comprises, as shown in FIG. 1, an anode passage plate 7, an anode substrate 3, an anode catalyst layer 2, an electrolyte membrane 1, a cathode catalyst layer 4, a cathode substrate 5, and a cathode passage plate 8. Known components may be used for these parts, that is, anode passage plate 7, anode substrate 3, anode catalyst layer 2, electrolyte membrane 1, cathode catalyst layer 4, cathode substrate 5, and cathode passage plate 8.

A methanol aqueous solution container 16 filled with a methanol aqueous solution is connected to a methanol feed port 12 of the anode passage plate 7 by way of a feed pump 19 (hereinafter called first feed pump). A methanol discharge port 13 of the anode passage plate 7 is connected to the methanol aqueous solution container 16. Oxidizer feeding means for supplying an oxidizer such as air is a pump (or draft fan) 20 connected to an oxidizer feed port 14 of the cathode passage plate 8. A discharge port 15 of the cathode passage plate 8 is connected to a cathode recovery container 18 by way of a check valve 24, and water and excess portion of the oxidizer discharged from the cathode electrode are collected in the container 18. Further, in the cathode recovery container 18, water is contained before start of power generation, and a pipe 26 is connected below the liquid level, so that the gas discharged from the cathode electrode contacts with the liquid in the water.

Since the methanol, formaldehyde and formic acid discharged from the cathode electrode are higher in solubility in water by two digits or more as compared with air or carbon dioxide, by gas-liquid contact in the water, these substances are dissolved in the liquid, and only air and carbon dioxide are discharged in the air of the container 18. In particular, the effect is higher when the internal pressure in the container 18 is higher, and it can be realized by adjusting the elastic body used in the check valve 24. The check valve 24 also functions to suppress counterflow of the liquid in the cathode recovery container 18. For example, as shown in FIG. 2, the check valve 24 can be fabricated from a pipe 35 and an elastic body 27 which is a valve fixed to the portion 36 of the pipe 39. That is, as shown from FIG. 2, as the air or water flows from the right, the elastic body 27 bends to allow to pass, but it functions as a barrier for the flow from the left and blocks the flow.

Further, as shown in FIG. 1, as methanol refilling means for refilling the methanol aqueous solution container 16 with methanol aqueous solution, depending on the concentration of the methanol aqueous solution in the methanol aqueous solution container evaluated from time-course changes of the load current, the second methanol aqueous solution container 17 and a feed pump 21 (hereinafter called second feed pump) are further provided. The top of the methanol aqueous solution container 16 is connected to the portion below the liquid level of the cathode recovery container 18 by way of a check valve 23, and the gas discharged from the methanol aqueous solution container 16 is designed to contact with the liquid in the water in the cathode recovery container 18. As a result, of the gases discharged from the methanol aqueous solution container 16, methanol gas and formaldehyde are dissolved in the water in the cathode recovery container 18, and only carbon dioxide is discharged into the gas in the cathode recovery container 18. Further, to feed the liquid in the cathode recovery container 18 into the first methanol aqueous solution container 16, the cathode recovery container 18 and first methanol aqueous solution container 16 are connected by way of a feed pump 22 (hereinafter called third feed pump). Accordingly, not only the methanol, formaldehyde and formic acid dissolved in the liquid in the cathode recovery container 18 can be recycled as fuel for reaction of anode electrode, but also these substances harmful for environments and human health can be decomposed completely. Moreover, to discharge the gas accumulated in the cathode recovery container 18 to outside, a pipe 28 is extended to outside from the cathode recovery container 18 by way of a check valve 25. A lid 29 is fitted to the end of the pipe, which prevents evaporation of the water in the cathode recovery container when the first direct methanol fuel cell is not generating power.

If the water in the cathode recovery container is evaporated completely, gas-liquid contact does not take place in the cathode recovery container 18, and the cathode catalyst layer 4 and electrolyte membrane 1 deteriorate due to drying, which may cause an power drop. The portion of the lid 29 may be coated with activated carbon or formaldehyde adsorbent (for example, nitrophenyl hydrazine), and discharge of harmful substance to outside can be suppressed as much as possible.

An apparatus for controlling this first direct methanol fuel cell battery is explained by referring to FIG. 3. This control apparatus is realized by flow rate control means for controlling the flow rate Jm (mL/min) of the methanol aqueous solution flowing in the anode passage 10, depending on the concentration of the methanol aqueous solution in the methanol aqueous solution container 16 evaluated by recording the load current as time-course changes corresponding to the operation time, and hence comprises a methanol flow rate control device and a current time-course change recording and evaluating device, Means for feeding from the methanol aqueous solution container 16 into the electromotive force section (DMFC) is a first feed pump 19, methanol refilling means is a second methanol aqueous solution container 17 and second feed pump 21, and means for feeding water from the cathode recovery container 18 into the first methanol aqueous solution container 16 is the third feed pump 22. The first, second, and third feed pumps are controlled by a methanol flow rate control device 31 and a current time-course change recording and evaluating device 32. An external circuit 33 is connected to the fuel cell electromotive force section (DMFC). The current time-course change recording and evaluating device 32 is connected to the methanol flow rate control device 31 and external circuit 33. Further, a heater (not shown) for heating the fuel cell electromotive force section (DMFC) is disposed in both anode passage plate and cathode passage plate. Besides, auxiliary devices 34 incorporated in this system, Including feed pumps, draft fan and heaters, are driven by the power of the direct methanol fuel cell, and hence the power source of the auxiliary devices 34 is directly coupled to the direct methanol fuel cell electromotive force section (DMFC).

For example, the flow rate control means 31 records time-course changes of the current supplied from the direct methanol fuel cell into the external circuit 33 by the current time-course change recording and evaluating device 32, and the feed rate of the feed pump 19 is controlled by the flow rate control means 31 depending on the methanol aqueous solution concentration in the methanol aqueous solution container 16 evaluated from the data.

The methanol refilling means sends a command to the second feed pump 21 depending on the methanol concentration evaluated by the flow rate control means 31, and feeds from the second methanol aqueous solution container 17 to the first methanol aqueous solution container 16.

Experimentally, when the concentration of the methanol aqueous solution in the methanol aqueous solution container is 0.5 M or less, methanol shortage occurs in the electromotive force section, and the power decreases suddenly. When the concentration of the methanol aqueous solution in the first methanol aqueous solution container 16 becomes 0.5 M or less, it is necessary to replace the methanol aqueous solution container 16 while leaving the methanol aqueous solution. Accordingly, as shown in FIG. 1 and FIG. 3, by feeding the methanol aqueous solution or high concentration from the second methanol aqueous solution container 17 into the first methanol aqueous solution container 16, by setting the methanol concentration in the first methanol aqueous solution container 16 to 0.5 M or more, the methanol aqueous solution in the first methanol aqueous solution container 16 can be recycled, and the methanol aqueous solution in the container 16 can be used up. Since the second methanol aqueous solution container 17 is dedicated for refilling, at the moment when the methanol aqueous solution in the second methanol aqueous solution container 17 is used up, the second methanol aqueous solution container 17 can be replaced. At the same time, by feeding water into the first methanol aqueous solution container 16 also from the cathode recovery container 18, the water shortage in the anode electrode can be solved. Moreover, by returning the methanol concentration in the first methanol aqueous solution container 16 to the initial concentration, the power can be restored.

Therefore, according to the first methanol fuel cell power generating device, it is not only easier to judge the timing for replacing the methanol aqueous solution container, but also convenient for recovering the spent methanol aqueous solution container industrially. Besides, as clear from the above explanation, since a concentrated methanol aqueous solution is put in the second methanol aqueous solution container 17, the volume can be decreased as compared with the volume of the first methanol aqueous solution 16. Therefore, the volume of the fuel container of the direct methanol fuel cell can be kept to a minimum limit. Moreover, the harmful matter of which atmospheric emission is controlled can be not only recycled, but also decomposed completely.

(Modified Example of First Embodiment)

Figure 16:
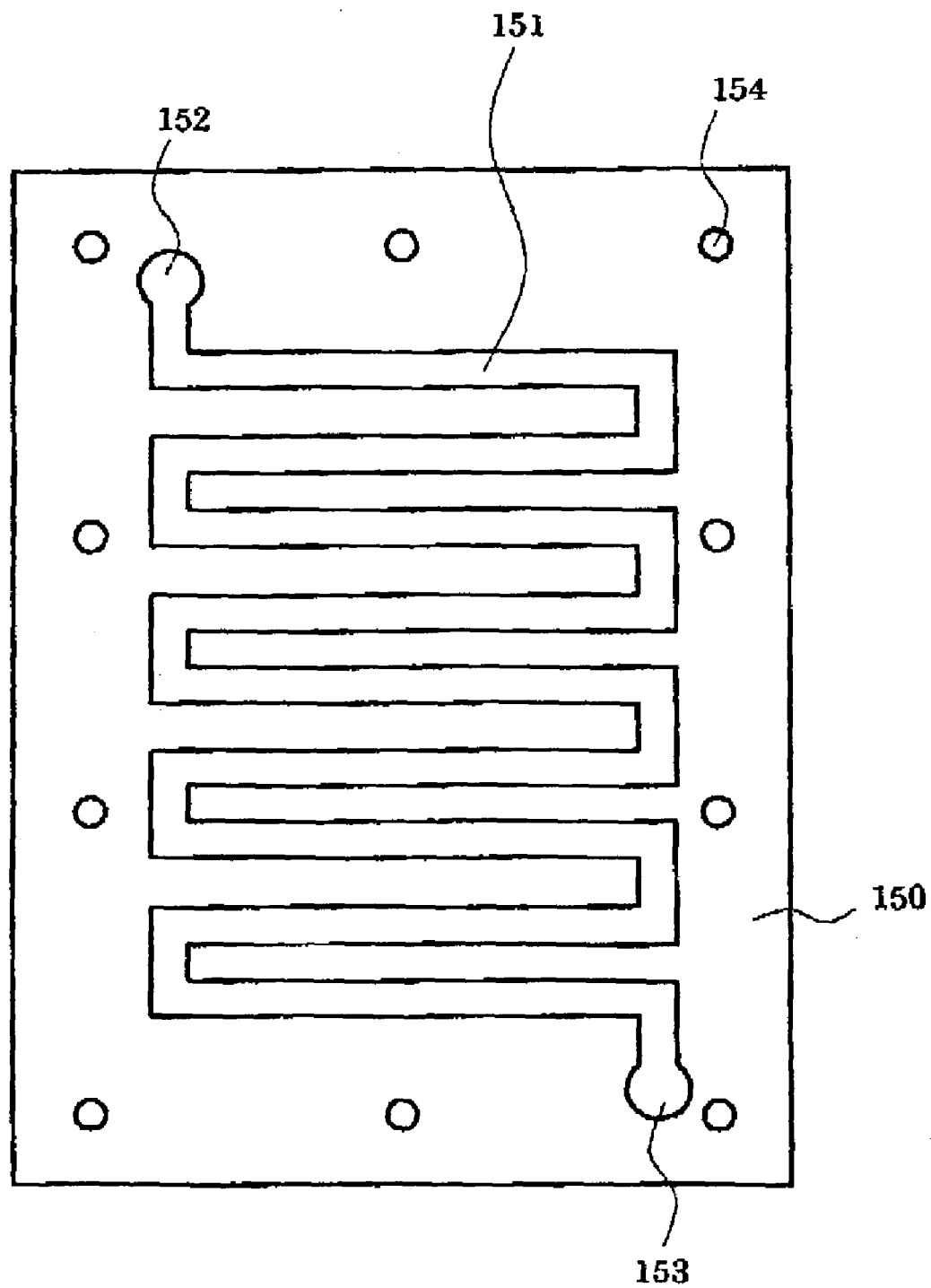
FIG. 16 is a schematic diagram showing an example of a passage plate used in the conventional standard direct methanol fuel cell power generating device.
Figure 17:
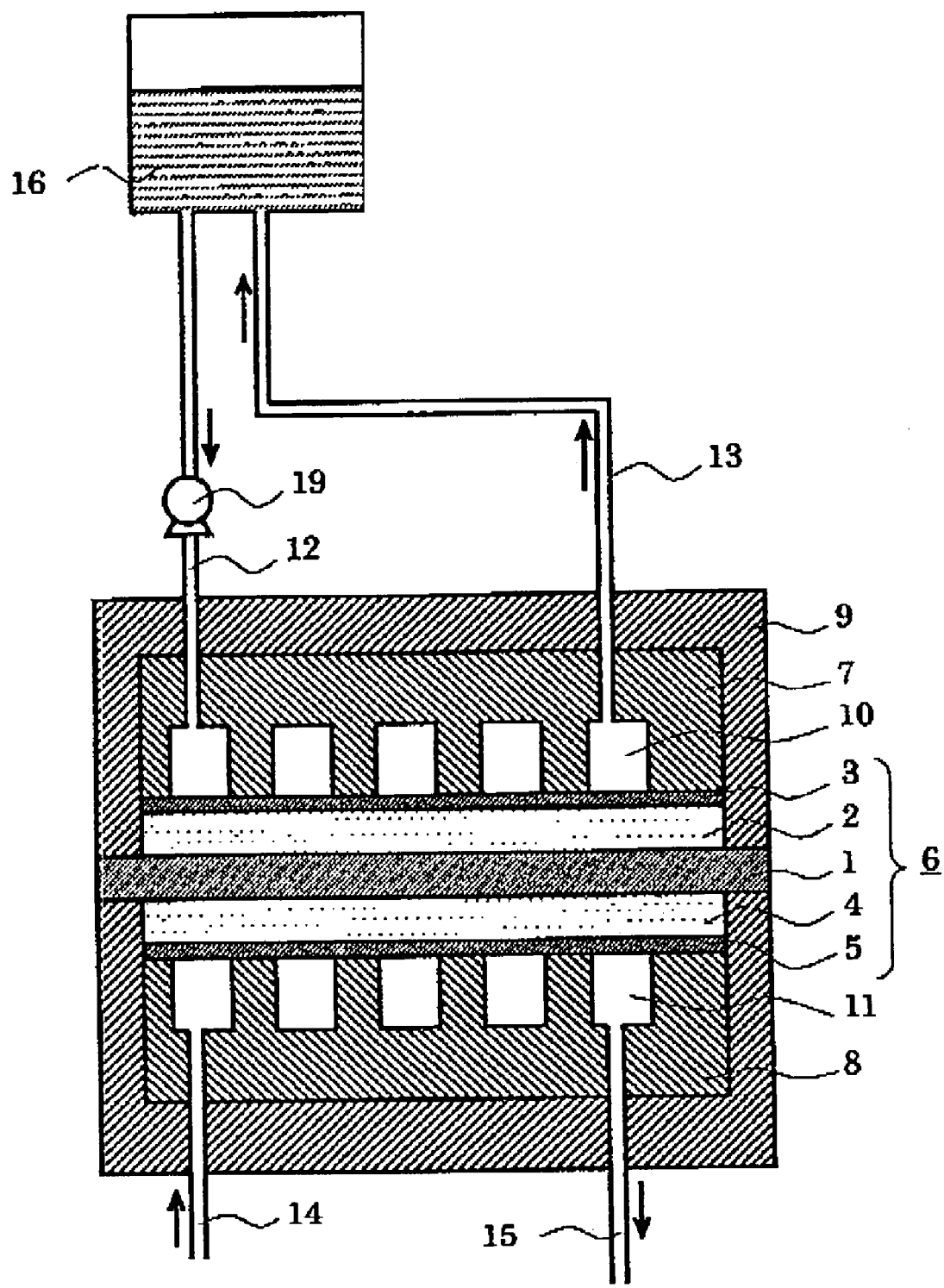
FIG. 17 is a schematic diagram of another conventional direct methanol fuel cell power generating device.

Further, the power generating device shown in FIG. 1 may also include a plurality of fuel cell electromotive force section units 6. FIG. 4 shows an example of laminating a plurality of fuel cell electromotive force section units 6 In series. In this case, as indicated by the arrow in FIG. 4 showing the methanol passage, the methanol aqueous solution is supplied into the individual fuel cell electromotive force sections 6, and the methanol aqueous solution discharged from the individual fuel cell electromotive force sections 6 are collected in one passage, and collected in the methanol aqueous solution container 16 (hereinafter called parallel feed method). On the other hand, by connecting a methanol discharge port 153 of an anode passage plate 150 shown in FIG. 16 and a methanol feed port 152 of the anode passage plate of the electromotive force section laminated adjacently, methanol can be supplied to the laminated electromotive force section in one non-branched methanol passage (hereinafter called series feed method) Moreover, having a plurality of feed pumps, each pump can feed to several electromotive force sections in series, and these routes can be bundled in parallel.

The first direct methanol fuel cell power generating device of the invention can not only decompose completely the substances harmful for the human health and environments generated in the anode electrode and cathode electrode, but also suppress power drop in long-time driving by recycling as fuel. Hence, the industrial benefits are outstanding.

(Methanol Aqueous Solution Calculating Means)

Next is explained means for calculating the methanol aqueous solution concentration in the methanol aqueous solution container from the time-course changes of the current flowing out from the direct methanol fuel cell. Briefly, supposing the current flowing out at time t in the external circuit to be $I(t)$, the methanol aqueous solution concentration $Cm(t)$ in the methanol aqueous solution container is given in the following formula 1.

[Formula 1]

Formula 1 is established on the basis of the fact that the methanol molecules and water molecules are spent equally in the reaction in the anode catalyst layer. In the formula, $Cm0$ is the methanol aqueous solution concentration (M) first contained in the methanol aqueous solution container, $Vm$ and $Vw$ are molar volumes of methanol and water, and $V$ is the volume of the methanol aqueous solution container.

If a more precise methanol concentration is desired, the quantity of electricity flowing in the external circuit and the methanol concentration in the methanol aqueous solution container are measured, and their relation can be deduced experimentally. When it is stored in the device, time-course changes of the current flowing our from the device can be recorded and evaluated, so that the flow velocity of the methanol aqueous solution to be fed can be changed accurately. Further, by storing the relation of the quantity of electricity flowing in the external circuit and the methanol concentration in the methanol aqueous solution container in the device, it is possible to know when to replace the methanol aqueous solution in the methanol aqueous solution container, and a battery life end sign can be produced same as in the commercial secondary battery, so that it is beneficial industrially. When the second methanol aqueous solution container is formed of a transparent container, the battery life end can be judged visually, and the first direct methanol fuel cell power generating device is more advantageous industrially.

FIG. 5 shows an example of flowchart for operating the first direct methanol fuel cell power generating device.

At start moment (S0), parameters Q and N in the flowchart are set at 0. The loop is executed at intervals of time Δt, and the current I(t) flowing out from the direct methanol fuel cell is measured as time-course change. Calculation of Q=Q+I (t) Δt in step 52 shows integration of the current by the time in order to determine the quantity of electricity Q. By the calculated quantity 0, the methanol concentration C in the methanol aqueous solution container is estimated. It can be estimated, for example, by using formula 1. Further, CA in step S4 in the flowchart is set at a methanol concentration increased in the flow rate dependence of the methanol aqueous solution with respect to the power, and, for example, 2 M is selected. When the methanol concentration In the first methanol aqueous solution container is over CA, that is, when the comparison at S4 is Yes, and the control is transferred to S1, the pump power is not changed. To the contrary, if the methanol concentration in the first methanol aqueous solution container is lower than CA, the pump power must be increased, and a command for increasing the pump power is issued in step S6, and then the control is returned to S1. As a result, the pump power can be increased continuously or intermittently within a necessary range.

However, when the methanol concentration in the first methanol aqueous solution container becomes lower than the specified concentration of CB, a command for refilling the methanol aqueous solution container with methanol aqueous solution is given (step S7). This value of CB should be set to 0.5 M or more, and if the methanol concentration drops below this level, the power cannot be recovered however much the pump power is increased. Accordingly, the methanol aqueous solution is supplied from the second methanol aqueous solution container into the first methanol aqueous solution container, and water is fed into the first methanol aqueous solution container from the cathode recovery container. The feeding necessary amount of methanol aqueous solution is supplied for recovering the methanol concentration in the first methanol aqueous solution container to the initial state. After the liquid feed, the concentration returns to the initial state, and parameter Q must be reset to 0 (step S7). Repeating this process, when exceeding the number of times of feed Nc using up the methanol aqueous solution in the second methanol aqueous solution container (result of evaluation in step S9), a command is given to replace the second methanol aqueous solution container (step S10). When the power generation by the direct methanol fuel cell power generating device is stopped, values of parameters Q and N must be stored, and it must be designed to start the flowchart from the stored value when the power generation is resumed.

(Gas-Liquid Separate Container)

Figure 6:
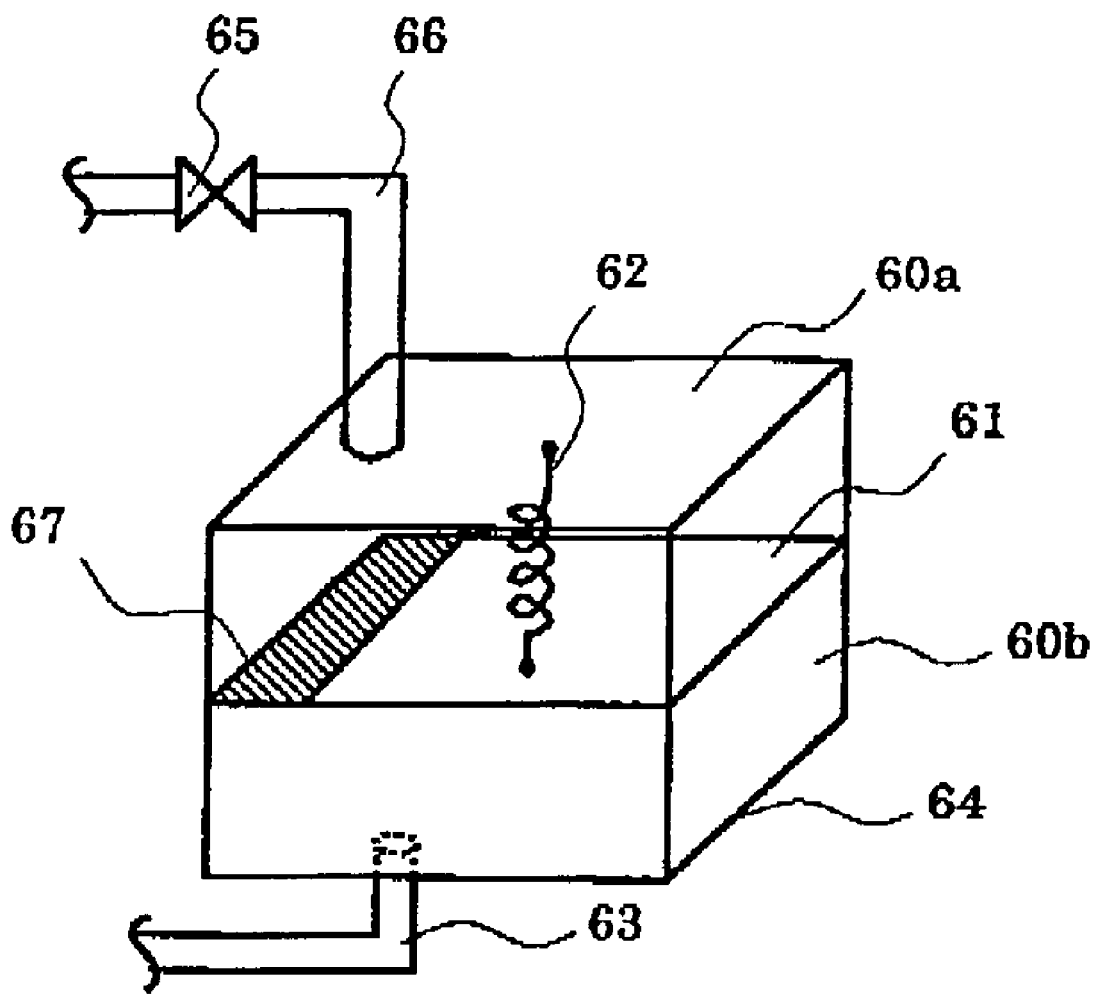
FIG. 6 is a schematic diagram of a container with gas-liquid separation function which can be used in the invention.
Figure 7A:
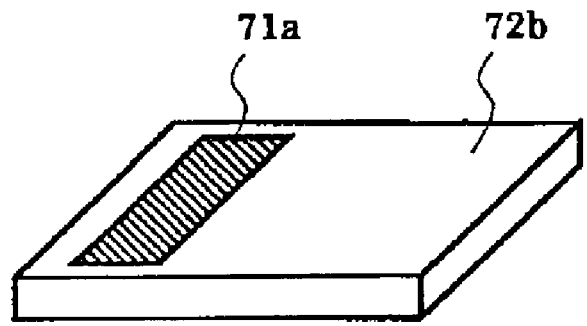
FIG. 7 is a schematic diagram of a partition board employed in the container with gas-liquid separation function for use in the invention.
Figure 7B:
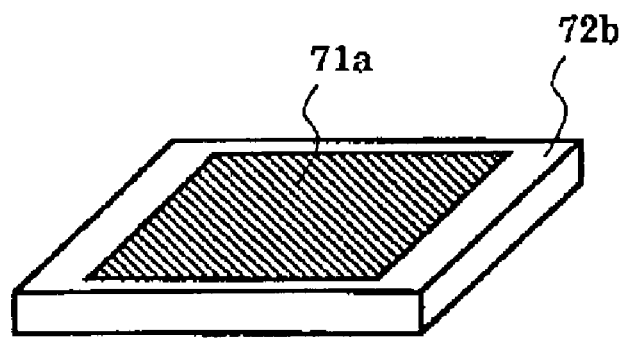
Figure 7C:
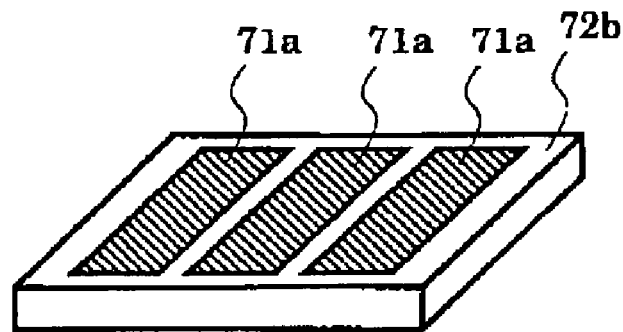
Figure 8:
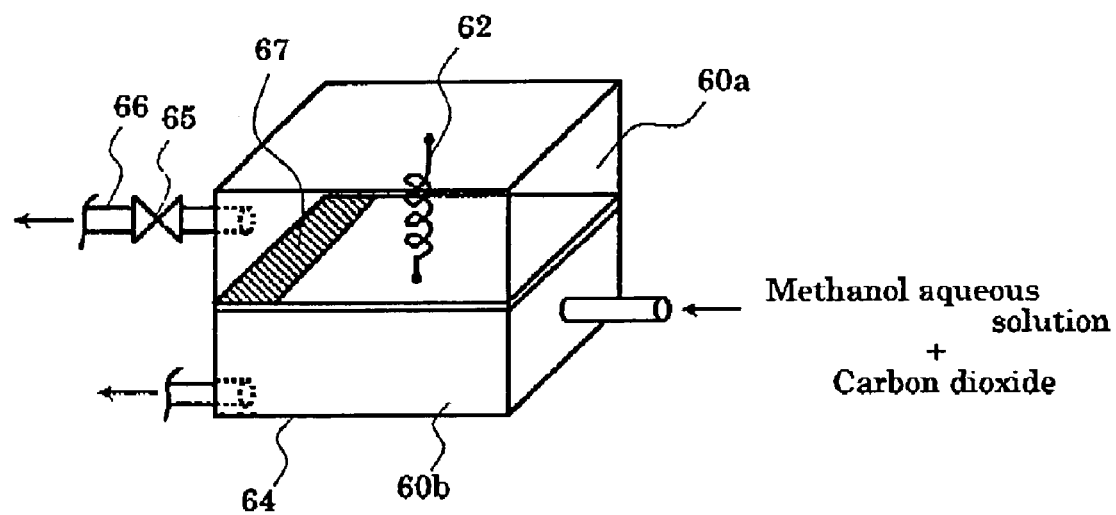
FIG. 8 is a schematic diagram showing an example in which the container with gas-liquid separation function is applied to a first methanol aqueous solution container.
Figure 9:
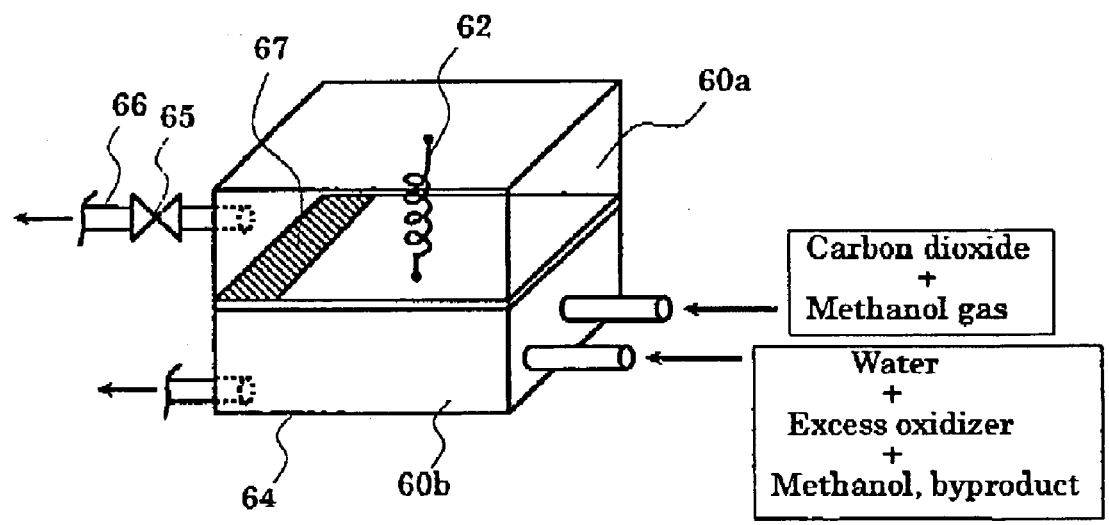
FIG. 9 is a schematic diagram showing another example in which the container with gas-liquid separation function is applied to a first methanol aqueous solution container.

An example of a gas-liquid separate container of the invention is explained by referring to FIG. 6 to FIG. 9. FIG. 6 is a schematic diagram showing an example of the gas-liquid separate container of the invention. FIG. 7 is a schematic diagram showing an example of arrangement of the gas-liquid separate container disposed on a partition board of the gas-liquid separate container. FIG. 8 is a schematic diagram showing flow of gas and liquid in the case where the gas-liquid separator container is applied to the first methanol aqueous solution container. FIG. 9 is a schematic diagram showing flow of gas and liquid in the case where the gas-liquid separator container is applied to the cathode recovery container.

As shown in FIG. 6, the gas-liquid separate container incorporates partition board 61 for separating into a gas compartment 60$a$ (or gas phase) and a liquid compartment 60$b$ (or liquid phase), and a spring-like elastic body 62 is connected between the inner wall and partition board, When a pipe 63 is connected beneath the liquid level, and liquid is injected from outside, the spring 62 contracts and the partition board 61 climbs up. As a result, the gas compartment is compressed, so that the internal pressure in the container 64 elevates. When a pipe 66 is connected to the gas phase of the container 64 by way of a check valve 65, at a slightly elevated point of internal pressure, the gas can be discharged outside. By using the gas-liquid separate container shown in FIG. 6, even when the container is changed upside down, the gas and liquid in the container are not mixed again. Therefore, regardless of the direction of placing of the container, the gas can be discharged outside. To realize such principle, a gas-liquid separation membrane 67 is disposed in part or whole of the partition board.

Generally, as a material for blocking passing of liquid and allowing only gas to pass, porous material such a cork, or organic film such as Gore-Tex may be used. In the gas-liquid separate container of the invention, however, the gas infected into the liquid phase contacts with the liquid in the liquid, and only the gas low in solubility in liquid is passed into the upper part of the partition board. Therefore, it is not effective to use a separation membrane of high permeation to pass into the gas phase, without allowing the gas of high solubility to be dissolved in the liquid, in the gas injected into the liquid phase. Generally, therefore, it is preferred to use an organic film, rather than the porous material having high permeability in gas.

Further, to enhance the transmission of gas while suppressing the transmission of liquid, it is required to adjust the pore size of the separation membrane, and the organic film is preferred, too, from the viewpoint of processing. From these viewpoints, in the invention, the organic film is used as the gas-liquid separation membrane. However, since the organic film is weaker in strength than the porous material, if a gap is formed between the film end portion and inner wall, the liquid may invade into the upper part of the partition board from this portion. It is hence preferred that the inner wall and partition board contact tightly with each other. From such point of view, the arrangement of the separation membrane on the partition board is studied. A shaded area 71$a$ in FIG. 7 A to FIG. 7C is a portion to which the gas-liquid separation membrane us attached. It is preferred that the gas-liquid separation membrane may not contact with the inner wall, and the gas-liquid separation membrane 71$a$ may be disposed at the end portion of the partition board 72$b$ as shown in FIG. 7A, or in the middle of the partition board 72$b$ as shown in FIG. 78. Further, as shown in FIG. 7C, plural gas-liquid separation membranes 71$a$ may be disposed on the partition board 72$b$.

Suppose the gas-liquid separate container is used in the first methanol aqueous solution container in the first direct methanol fuel cell. As shown in FIG. 8, the methanol aqueous solution is discharged by the first feed pump, and the carbon dioxide produced by reaction and an excess portion of the methanol aqueous solution are injected into the liquid phase. The liquid is methanol aqueous solution, and evaporating methanol gas and carbon dioxide permeate into The gas phase through the gas-liquid separation membrane. From the gas phase, carbon dioxide and methanol gas evaporated inside the container are discharged. For such gas-liquid separation, It is most preferred to use a polyether sulfonic film as a separation membrane. The reason is that the solubility of carbon dioxide in the film is larger.

Further, suppose the gas-liquid separate container Is used in the cathode recovery container in the first direct methanol fuel cell. As shown in FIG. 9, the water produced in reaction In the cathode electrode, an excess portion of the oxidizer, byproducts (formaldehyde, formic acid), and an unreacted matter of the methanol are injected into the liquid phase, and gas-liquid contact is achieved in the liquid phase. Moreover, carbon dioxide generated in the anode electrode and methanol are also injected into the liquid phase, and gas-liquid contact is achieved in the liquid phase. The liquid is water, and formaldehyde, formic acid and methanol high in volubility in water are dissolved in water, and carbon dioxide and oxidizer (air or oxygen) pass into gas phase by way of the gas-liquid separation membrane. Therefore, the methanol aqueous solution containing formaldehyde and formic acid is discharged from the liquid phase. Further, from the gas phase, carbon dioxide and oxidizer are discharged outside. For such gas-liquid separation, it is most preferred to use a cellulose based film, a chitosan based film, a PVA based film or a complex membrane mainly composed of these components as the separation membrane. It is because these flints hardly pass alcoholic components, but easily pass oxidizer and carbon dioxide.

Second Embodiment

Figure 10:
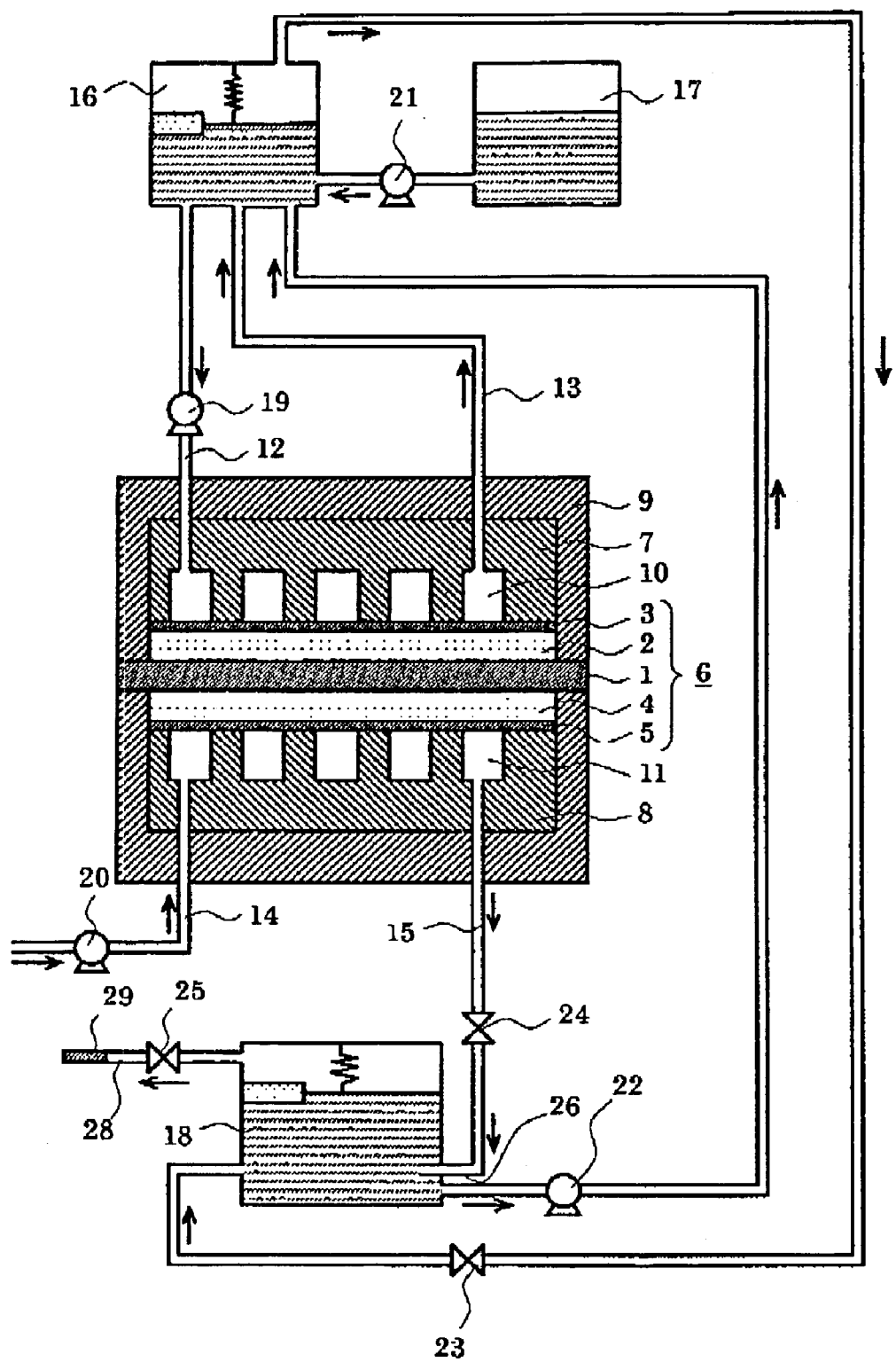
FIG. 10 is a schematic diagram showing a second embodiment of a direct methanol fuel cell power generating device of the invention.

An example of a second direct methanol fuel cell power generating device of the invention is described while referring to FIG. 10.

FIG. 10 is a schematic diagram showing a configuration of an example of the second direct methanol fuel cell power generating device of the invention.

This second direct methanol fuel cell power generating device is characterized by using a container having gas-liquid separating function as the first methanol aqueous solution container and cathode recovery container in the first direct methanol fuel cell power generating device. The liquid feeding and gas feeding methods are exactly same as in the first direct methanol fuel cell power generating device. However, by using the gas-liquid separate container, even if the power generating device is changed upside down, the gas and liquid in the container are not mixed again, so that liquid feed and gas feed as shown in FIG. 10 can be executed smoothly. Hence, the second direct methanol fuel cell power generating device can be used as the power source for a mobile electronic appliance.

In the foregoing description, the methanol aqueous solution is used as fuel of the invention, but instead of methanol, for example, another volatile lower alcohol such as ethanol may be used. Such alcohol may contain another alcohol or volatile organic matter.

Third Embodiment

Figure 11:
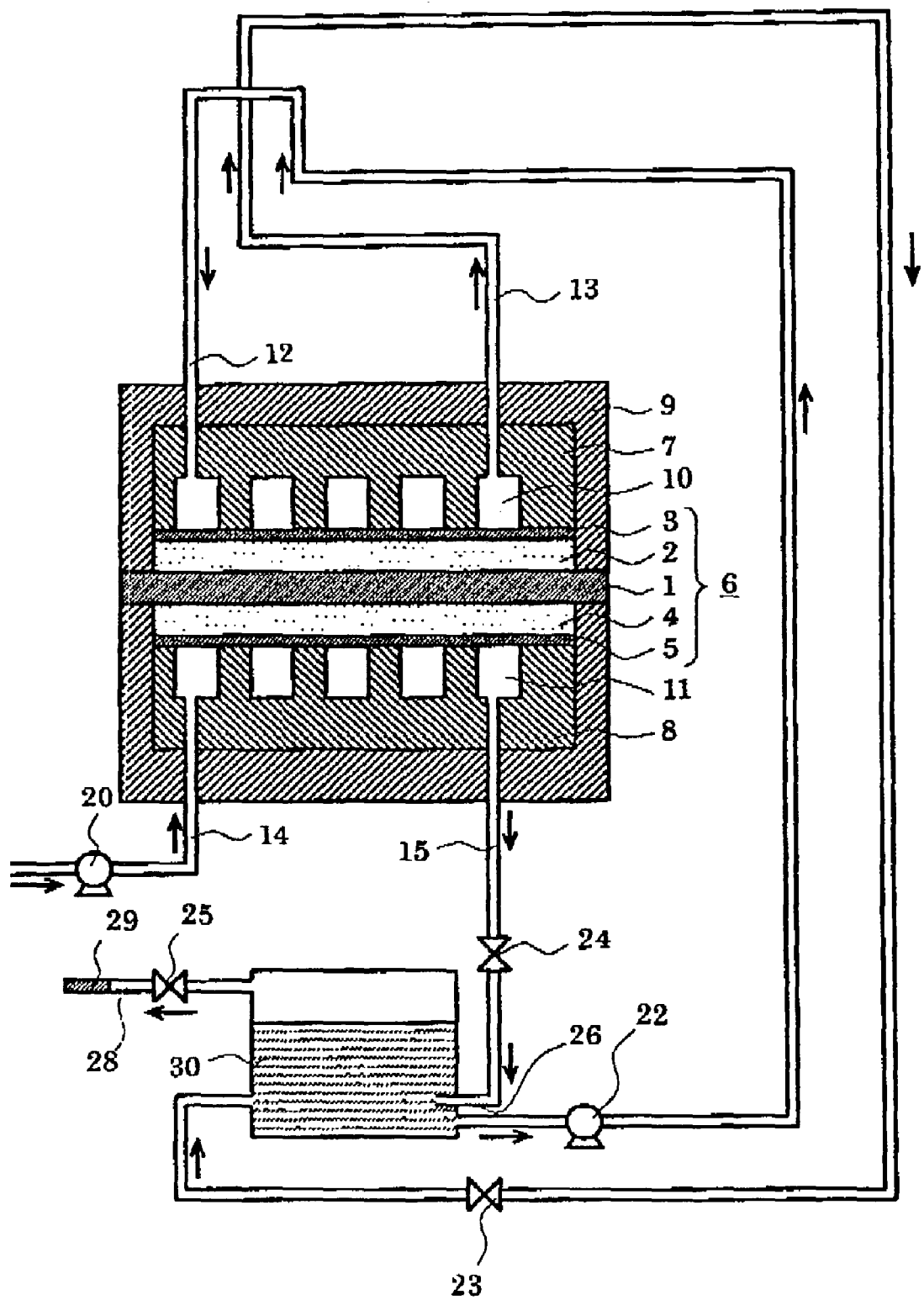
FIG. 11 is a schematic diagram showing a third embodiment of a direct methanol fuel cell power generating device of the invention.

In the first embodiment shown in FIG. 1, the first methanol aqueous solution container 16 is used as the methanol fuel feed container, and the cathode recovery container 18 is separately disposed, and the methanol fuel collected in the cathode recovery container 18 was recycled by returning to the first methanol aqueous solution container 16 by the pump 22. In this device, however, both first methanol aqueous solution container and cathode recovery container are needed, and the device size is increased. This embodiment is intended to improve the volume efficiency of the device by integrating the methanol aqueous solution container and cathode recovery container. This device is shown in FIG. 11. In FIG. 11, same members having same functions as in FIG. 1 are identified with same reference numerals and duplicate description is omitted.

In the methanol fuel feed port 12 of the anode passage plate of the fuel cell electromotive force section unit 6, a methanol is supplied from the cathode recovery container 30 serving as a methanol aqueous solution container by using the pump 22. On the other hand, excess fuel and others discharged from the fuel discharge port 13 return to the methanol aqueous solution container combined with cathode recovery container 30 by way of the check valve 23. Air or other oxidizer is supplied to the oxidizer feedport 14 through the pump 20, while an aqueous solution mixing water, excess oxidizer, residual methanol, formaldehyde, and other reaction products are discharged front an oxidizer discharge port 15, and therefore it is led in while bubbling into the methanol aqueous solution contained in the methanol aqueous solution container combined with cathode recovery container 30. As a result, discharge of harmful substance from the cathode discharge port can be prevented.

In this device, the second methanol aqueous solution container used in the device in FIG. 1 is omitted, but a similar container may be connected to the methanol aqueous solution container combined with cathode recovery container 30.

EXAMPLES

Referring now to the drawings, examples are explained in detail below.

Example 1

Figure 12:
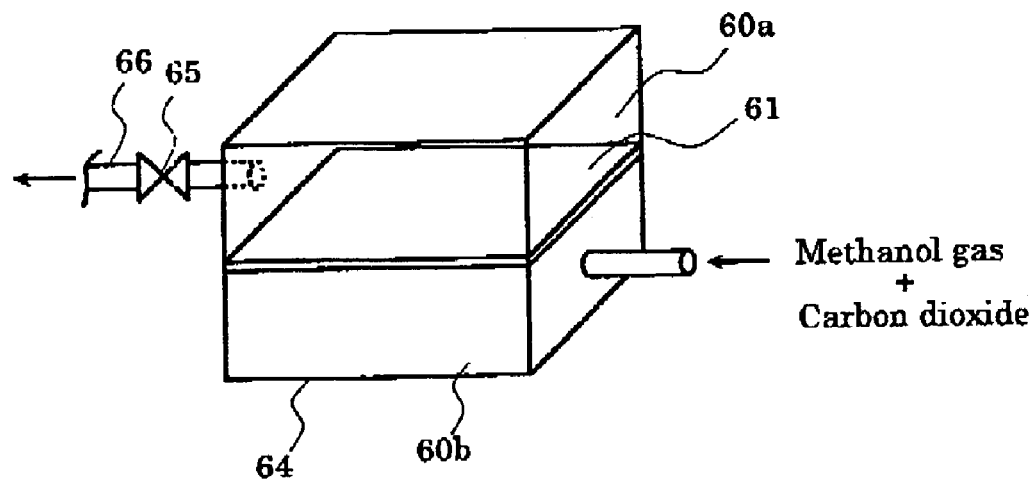
FIG. 12 is a schematic diagram showing an experimental device in Example 1.
Figure 13:
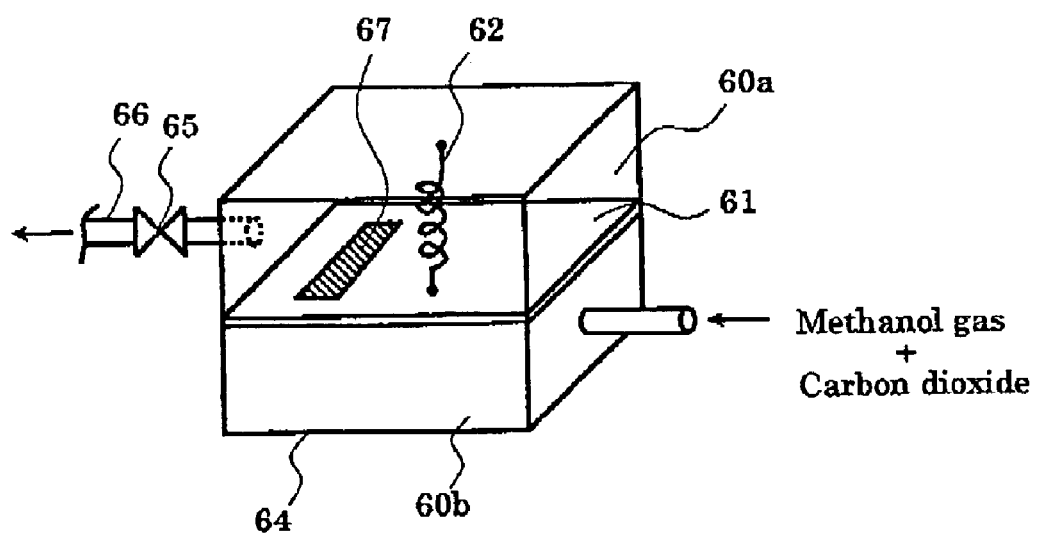
FIG. 13 is a schematic diagram showing an experimental device in Example 2.
Figure 14:
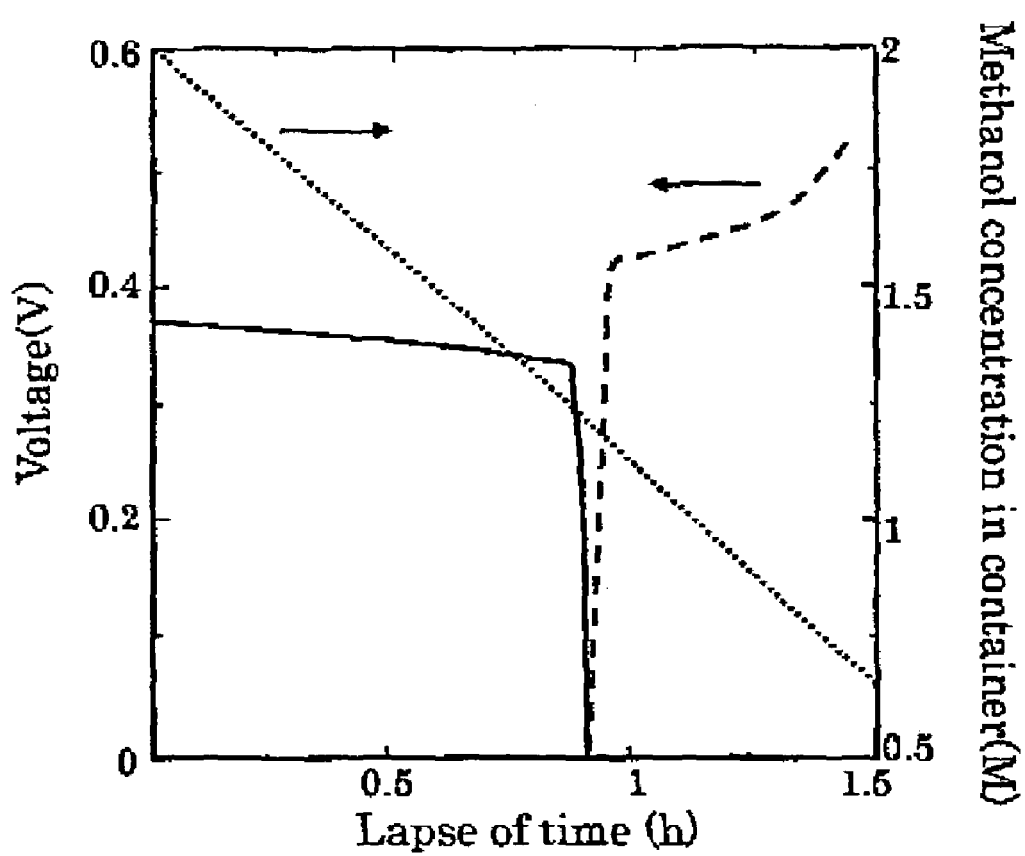
FIG. 14 is a characteristic diagram showing results of measurement in Example 3.
Figure 15:
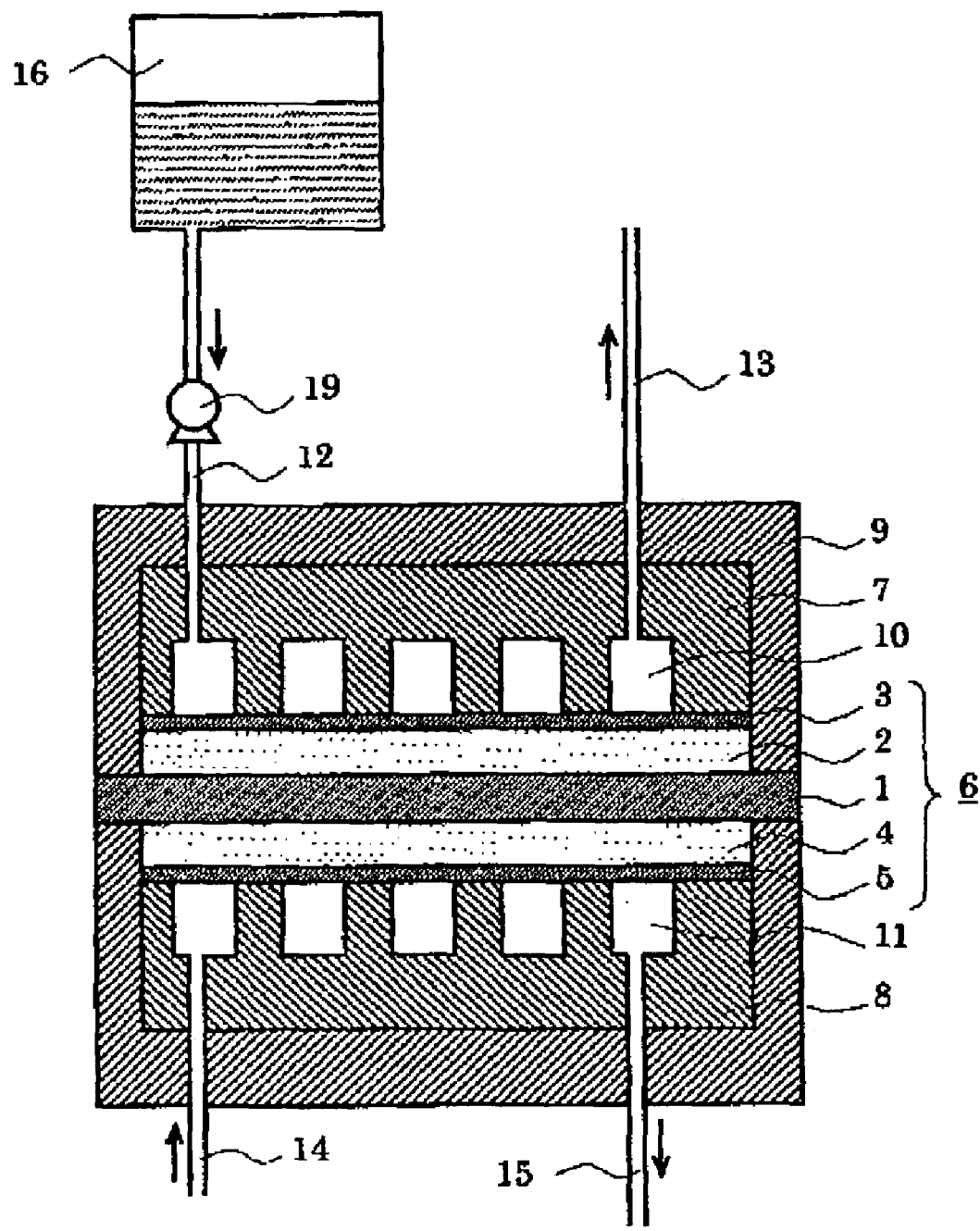
FIG. 15 is a schematic diagram of a conventional standard direct methanol fuel cell power generating device.

A plastic container with an inner volume of 7 cm×5 cm sectional area) A 10 cm (height) was prepared. The thickness of each side of the container is 1 mm. Since this container is transparent, the contents can be observed. As shown in FIG. 12, a hole of sectional area of 1 cm×1 cm was drilled in the lowest part of the side face, and a 3-cm long plastic pipe (pipe A) was connected. The junction was sealed to prevent leak of a methanol aqueous solution from the gap between the pipe and the container. At the opposite side of the side face, a hole of sectional area of 1 cm×1 cm was drilled in the portion of 0.5 cm from the top, and a 3-cm long plastic pipe (pipe B) was connected thereto. To prevent the pipes from slipping out when the internal pressure in the container is raised, they were fixed by using an adhesive. A commercial check valve was also attached to the pipe B. As check valve, both A and B were prepared, and it is designed to discharge the gas in the container to outside when the internal pressure in the container exceeds 1.01 atm or 1.02 atm or more. The container was filled with water to a height of 6 cm, and a mixed gas at mixing ratio of 1:10 (methanol gas: carbon dioxide by molar ratio) heated to 70° C. equivalent to the operating temperature of the direct methanol fuel cell was supplied from the pipe A at a flow rate of 10 ml/min by using a pump to achieve gas-liquid contact. However, the container itself was not heated, and the experiment was conducted at room temperature. First, the experiment was conducted by fitting the check valve A. About 9 seconds later, the check valve was opened, and it was confirmed that the gas was discharged from the pipe B. The discharged gas was sampled, and when the molar ratio of the gas was investigated by the TCD method of gas chromatography, it was found to be the ratio of methanol gas: carbon dioxide=1:950. The gas-liquid contact in the water was confirmed to be effective for removing methanol gas from the mixed gas of methanol gas and carbon dioxide.

A similar experiment was conducted by replacing the check valve A with check valve B. About 20 seconds later, the check valve was opened, and it was confirmed that the gas was discharged from the pipe B. The molar ratio of the mixed gas was investigated by the TCD method of gas chromatography, and it was found to be the ratio of methanol gas: carbon dioxide=1:1005. The gas-liquid contact for raising the internal pressure of the container was found to be effective.

Example 2

<Fabrication of Gas-Liquid Separate Container>

A plastic container having a sectional area of 7 cm×5 cm, and a height of 10 cm was prepared. The thickness of each side of the container is 1 mm. The top of this container is empty, and a plastic lid of 2 mm in thickness and sectional area of 7.1 cm×5.1 cm was prepared. Since this container is transparent, the contents can be observed. Further, as shown in FIG. 19, a hole of sectional area of 1 cm×1 cm was drilled in the lowest part of the side face, and a 3-cm long plastic pipe (pipe A) was connected. The junction was sealed to prevent leak of methanol aqueous solution from the gap between the pipe and container. At the opposite side of the side face, a hole of sectional area of 1 cm×1 cm was drilled in the portion of 0.5 cm from the upper face, and a 3-cm long plastic pipe (pipe B) was connected. They were fixed by using an adhesive so as to prevent the pipes from slipping out when the internal pressure in the container is raised. The check valve B used In example 1 was attached to the pipe B.

Next, a commercial spring was fitted to the center of the lid of the container, and a plastic partition board of 1 mm in thickness and sectional area of 5 cm×7 cm was fixed to the other end of the spring. A sectional view of this partition board is shown in FIG. 20. Four holes (shaded areas) are opened in the partition board, and a gas-liquid separation membrane is fitted in this portion. Four gas-liquid separation membranes of each type were prepared, that is, a polysulfonic film (film A) of thickness of 100 μm and sectional area of 2.2 cm×1.2 cm, and a cellulose acetate film (film B) of thickness of 100 μm and sectional area of 2.2 cm×1.2 cm. The film B is a cellulose film. First, the film A was sealed and fixed in the hole of the partition board. Grease was applied in the edge portion of the partition board, and smooth sliding of the partition board in the inner wall of the container was confirmed. Finally, the container was filled with water to a height of 6 cm, and the lid was closed, and the contact portion was sealed so that the air would not leak out from the contact portion of the lid and outer wall.

After making sure the partition board contacted with the liquid level and stopped, the following experiment was conducted. The experiment was same as in example 1, that is, a mixed gas at mixing ratio of 1:10 (methanol gas: carbon dioxide by molar ratio) heated to 70° C. equivalent to the operating temperature of the direct methanol fuel cell was supplied from the pipe A at a flow rate of 10 ml/min by using a pump to achieve gas-liquid contact. However, the container itself was not heated, but the experiment was conducted at room temperature. First, the gas stayed in the lower portion of the partition board and liquid level, and gradual elevation of the partition board was observed. About one minute later, when elevating by about 5 mm, elevation of the partition board stopped. Thereafter, about 25 seconds later, the check valve was opened, and it was confirmed that the gas was discharged from the pipe B. The discharged gas was sampled, and when the molar ratio of the gas was investigated by the TCD method of gas chromatography, it was found to be the ratio of methanol gas: carbon dioxide=1:2110. By using the gas-liquid separation membrane, the gas injected into the liquid phase is not immediately moved to the gas phase, and therefore it seems that the methanol was dissolved more in the liquid than in example 1. Accordingly, by using the gas-liquid separate container, it is confirmed that the gas-liquid contact is more effective. When the container was observed from outside, it is known that the liquid has hardly invaded into the gas phase through the gas-liquid separation membrane.

Removing the lid, the gas-liquid separation membrane of the partition board was replaced with the film B. The liquid in the container was discarded, and water poured in again to a height of 6 mm. Closing the lid, the contact portion was sealed. Same as before, after making sure the partition board contacted with the liquid level and stopped, the following experiment was conducted. The experiment was same as in example 1, that is, a mixed gas at mixing ratio of 1:10 (methanol gas: carbon dioxide by molar ratio) heated to 70° C. equivalent to the operating temperature of the direct methanol fuel cell was supplied from the pipe A at a flow rate of 10 ml/min by using a pump to achieve gas-liquid contact. However, the container itself was not heated, but the experiment was conducted at room temperature. same as in the case of the film A, first, the gas stayed in the lower portion of the partition board and liquid level, and gradual elevation of the partition board was observed. About one minute and 30 seconds later, when elevating by about 1 cm, elevation of the partition board stopped. About 33 seconds later, the check valve was opened, and it was confirmed that the gas was discharged from the pipe B. The discharged gas was sampled, and when the molar ratio of the gas was investigated by the TCD method of gas chromatography, it was found to be the ratio of methanol gas: carbon dioxide=1:4235. Since the film B hardly passes methanol gas as compared with the film A, it is estimated that methanol was dissolved in the liquid more in the film B than in the case of the film A. That is, in the case of gas-liquid contact in water, the film B was proved to be superior as the gas-liquid separation film.

Example 3

<Fabrication of Electromotive Force Section of Direct Methanol Fuel Cell>

By a known process (R. Ramakumar et al., J. Power Sources 69 (1997) 75), anode catalyst (Pt: Pu=1:1) carrying carbon black and cathode catalyst (Pt) carrying carbon black were prepared. The catalyst carrying amount was 30 of anode and 15 of carbon in 100 of carbon in ratio by weight. The anode catalyst layer was fabricated by using the anode catalyst carrying carbon black prepared in this process, and adding a perfluorocarbon sulfonic acid solution (Nafion solution SE-20092 of DuPont) and ion exchange water, and dispersing the catalyst carrying carbon black to prepare paste. This paste was applied by 550 μm on a water-repellent carbon paper TGPH-120 (made by E-TEK), and dried. The cathode catalyst layer was fabricated by using the cathode catalyst carrying carbon black prepared in this process, and adding perfluorocarbon sulfonic acid solution (Nafion solution SE-20092 of DuPont) and ion exchange water, and dispersing the catalyst carrying carbon black to prepare paste. This paste was applied by 255 μm on a water-repellent carbon paper TGPH-090 (made by E-TEK), and dried. On both sides of the commercial perfluorocarbon sulfonic acid film (Nafion 117 of DuPont), the anode catalyst layer and cathode catalysts layer prepared in the process were pressed by a hot press (125° C., 5 minutes, 100 kg/cm$^2$), and a junction was prepared. The sectional area was adjusted to 10 cm$^2$. When the prepared junction was cut off and observed by electron microscope, the anode catalyst layer thickness was 105 μm and the cathode layer thickness was 50 μm, and a favorable junction was confirmed.

<Fabrication of Direct Methanol Fuel Cell>

The fabricated electromotive force section was installed in a carbon separator, and tightened with screws to enclose. The separator has a silicon rubber, and the temperature was controlled by using a commercial temperature controller until the inside of the holder became always 70° C. The separator has a groove in a shape of passage plate in FIG. 2, cut in both anode side and cathode side, and by connecting a tube to the inlet portion, methanol aqueous solution or air can be supplied by a pump. Further, a tube was connected to the discharge port portion of the anode passage plate, and one end of the tube was connected to the methanol aqueous solution container so that the methanol aqueous solution not soaked in the anode carbon paper maybe returned to the methanol aqueous solution container. Moreover, a pipe was connected to the discharge port of the cathode electrode side passage plate, and the water discharged from the cathode electrode was recovered in the cathode recovery container. The cathode recovery container was an ordinary beaker with an open top. In the methanol aqueous solution container (volume 10 ml), methanol aqueous solution was poured, and fed by using a commercial feed pump. At the cathode side, air was sent In by using a commercial air pump. The air feed rate was controlled by using a commercial mass flow controller. The liquid feed rate could be adjusted in a range from 0.06 ml/min to 6 ml/min, and the air feed rate was adjustable in a range from 20 ml/min to 5 liters/min. As the load, a commercial electronic load machine was used. Voltage detecting means was a commercial digital multimeter.

<Measurement of Current-Voltage Characteristic>

Feeding 2 M methanol aqueous solution to the anode catalyst layer at a flow rate of 0.1 ml/min, and air to the cathode catalyst layer at a flow rate of 500 ml/min, voltage changes were measured while passing a load current of 1.5 A. Results of measurement are shown in FIG. 21. The voltage remained constant at about 3.7 V up to 50 minutes of current passing, but the voltage decreased suddenly thereafter. The concentration of the methanol aqueous solution estimated from formula 1 is 1.2 M, and it was estimated that methanol fuel shortage occurred in the electromotive force section. When the methanol aqueous solution feed rate was increased to 0.4 ml/min, a load current of 1.5 A was obtained and the voltage was recovered to about 0.45 V, and the load current could be passed for further 30 minutes. It was confirmed that the power was recovered by increasing the methanol flow rate by four times. After measurement, the methanol concentration of the methanol aqueous solution in the methanol aqueous solution container was measured by gas chromatography, and 0.6 M was obtained, and about 9 ml of methanol aqueous solution was left over in the container. In the cathode recovery container, on the other hand, about 0.5 ml of water was collected. This water was measured by TCD method of gas chromatography, it was identified to be methanol aqueous solution of concentration of about 0.01 M containing formaldehyde.

Example 4

In a second methanol aqueous solution container, 125 ml of 20 M methanol aqueous solution was poured, and 0.75 ml of the solution was dispensed in a first methanol aqueous solution container. Further, 0.25 ml of the solution in the cathode recovery container was poured into the first methanol aqueous solution container. As a result, the first methanol aqueous solution container holds 10 ml of about 2 M methanol aqueous solution. By the same experiment as in example 5, nearly same results of experiment as in FIG. 21 were obtained. Accordingly, after passing load current of 1.5 A for 1 hour and 20 minutes, 0-75 ml of methanol aqueous solution was taken from the second methanol aqueous solution container and 0.25 ml of solution was taken from the cathode recovery container, and they were added to the first methanol aqueous solution container, and a load current of 1.5 A was passed again. By repeating this operation five times, continuous driving of 6 hours and 40 minutes was achieved. The methanol concentration in the first methanol aqueous solution container was measured by gas chromatography, and about 0.65 M was obtained, and remainder of 9 ml was confirmed. Almost no methanol aqueous solution was left over in the second methanol aqueous solution container. In the cathode recovery container, 2.2 ml of solution was left over. This solution was analyzed by TCD method of gas chromatography, and was identified to be methanol aqueous solution of about 0.015 M containing formaldehyde.

The invention presents a direct liquid fuel cell power generating device capable of suppressing drop of power in power generation for a long period, and suppressing discharge of harmful matter for the environment and human health.

What is claimed is:

1. A direct liquid fuel cell power generating device comprising:
    an electromotive force section unit composed of an anode electrode formed of an anode catalyst layer and an anode substrate, a cathode electrode formed of a cathode catalyst layer and a cathode substrate, and an electrolyte membrane carried in contacting with the anode catalyst layer and the cathode catalyst layer;
    an anode passage plate forming a fuel passage disposed in contact with the anode substrate;
    a cathode passage plate forming an oxidizer passage disposed in contact with the cathode substrate;
    an anode feed port for feeding fuel to one end of the fuel passage, and an anode discharge port disposed at the other end of the fuel passage;
    a cathode feed port for feeding an oxidizer to one end of the oxidizer passage, and a cathode discharge port disposed at the other end of the oxidizer passage;
    a fuel container connected to the anode feed port;
    a cathode recovery container connected to the cathode discharge port for collecting the fuel supplied to the electromotive force section unit, an unreacted matter of the oxidizer, and a product of battery reaction in the electromotive force section;
    a mechanism connecting the cathode discharge port and the cathode recovery container by piping for achieving gas-liquid contact by making contact between the substance discharged from the cathode discharge port and water existing in the cathode recovery container, in order to dissolve material discharged from the cathode electrode into the water;
    a mechanism for feeding the aqueous solution collected in the cathode recovery container into the fuel container;
    a mechanism connecting the fuel container and the cathode recovery container by piping for achieving gas-liquid contact by making contact between the gas discharged from the fuel container and water existing in the cathode recovery container; and
    a mechanism connecting the anode discharge port to the fuel container such that gas generated in the fuel passage is not vented directly from the fuel passage to the external environment.

2. The direct liquid fuel cell power generating device according to claim 1, wherein the fuel is a methanol aqueous solution.

3. The direct liquid fuel cell power generating device according to claim 1, further comprising another fuel container containing fuel of high concentration connected to the fuel container through liquid feed means.

4. The direct liquid fuel cell power generating device according to claim 1, further comprising fuel flow rate control means disposed between the fuel container and the anode feed port.

5. The direct liquid fuel cell power generating device according to claim 1, wherein at least one of the fuel container and cathode recovery container is composed of a container main body, and a partition board disposed in the container main body for separating into gas and liquid, and part or whole of the partition board is composed of a gas-liquid separation membrane.

6. The direct liquid fuel cell power generating device according to claim 5, wherein the gas-liquid separation membrane is an organic film.

7. The direct liquid fuel cell power generating device of claim 1, wherein a second fuel container is connected to the fuel container by way of a fuel passage having fuel flow rate control means, and fuel of high concentration from the fuel contained in the fuel container is charged in the second fuel container.

8. The direct liquid fuel cell power generating device according to claim 1, further comprising a check valve disposed in a pipeline connected between the cathode recovery container and the cathode discharge port to suppress gas flow from the cathode recovery container to the cathode discharge port.

9. The direct liquid fuel cell power generating device according to claim 1, wherein the fuel passage formed by the anode passage plate is not in direct communication with a vent to an external environment.

10. The direct liquid fuel cell power generating device according to claim 1, wherein the mechanism connecting the cathode discharge port and the cathode recovery container by piping is connected to the cathode recovery container below a water level of water in the cathode recovery container such that gas discharged from the cathode discharge port makes contact with water in the cathode recovery container.

11. The direct liquid fuel cell power generating device according to claim 6, wherein the organic film is one of a cellulose based film, a chitosan based film, a PVA based film or a complex membrane film mainly composed of these components.

\* \* \* \* \*